(12) United States Patent
Azzouz et al.

(10) Patent No.: US 12,051,947 B2
(45) Date of Patent: Jul. 30, 2024

(54) COOLING RADIATOR FOR MOTOR FAN UNIT

(71) Applicant: Valeo Systemes Thermiques, Le Mesnil-Saint-Denis (FR)

(72) Inventors: Kamel Azzouz, Le Mesnil Saint Denis (FR); Amrid Mammeri, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 736 days.

(21) Appl. No.: 17/253,252

(22) PCT Filed: Jun. 19, 2019

(86) PCT No.: PCT/FR2019/051498
§ 371 (c)(1),
(2) Date: Dec. 17, 2020

(87) PCT Pub. No.: WO2019/243740
PCT Pub. Date: Dec. 26, 2019

(65) Prior Publication Data
US 2021/0281144 A1   Sep. 9, 2021

(30) Foreign Application Priority Data

Jun. 21, 2018  (FR) ..................... 1855534

(51) Int. Cl.
*H02K 11/33* (2016.01)
*B60K 11/02* (2006.01)
(Continued)

(52) U.S. Cl.
CPC .............. *H02K 11/33* (2016.01); *B60K 11/02* (2013.01); *B60K 11/06* (2013.01); *H02K 5/18* (2013.01);
(Continued)

(58) Field of Classification Search
CPC .......... B60K 11/02; B60K 11/06; H02K 5/18; H02K 5/20; H02K 5/203; H02K 11/33; H02K 21/22; H02K 2211/03
(Continued)

(56) References Cited

U.S. PATENT DOCUMENTS

| 6,191,511 B1 * | 2/2001 | Zysset ................... H02K 9/197 |
| | | 310/59 |
| 2005/0168081 A1 * | 8/2005 | Takenaka ............... H02K 11/33 |
| | | 310/75 R |

(Continued)

FOREIGN PATENT DOCUMENTS

| CN | 101617126 A | 12/2009 |
| DE | 112012004272 T5 | 7/2014 |

(Continued)

OTHER PUBLICATIONS

International Search Report with English Translation issued in corresponding PCT Application No. PCT/FR2019/051498, Dated Nov. 22, 2019 (7 Pages).

(Continued)

*Primary Examiner* — Rashad H Johnson
(74) *Attorney, Agent, or Firm* — Osha Bergman Watanabe & Burton LLP (57) ABSTRACT

A cooling radiator intended to be incorporated in a motorized fan unit of a motor vehicle. The cooling radiator includes a transverse wall extended perpendicularly at its perimeter by a peripheral wall so as to define an internal volume. At least one wall of the cooling radiator forms a support for at least one portion of a cooling circuit in which a cooling fluid circulates.

8 Claims, 7 Drawing Sheets

(51) Int. Cl.
*B60K 11/06* (2006.01)
*H02K 5/18* (2006.01)
*H02K 5/20* (2006.01)
*H02K 21/22* (2006.01)

(52) U.S. Cl.
CPC .............. *H02K 5/20* (2013.01); *H02K 5/203* (2021.01); *H02K 21/22* (2013.01); *H02K 2211/03* (2013.01)

(58) Field of Classification Search
USPC ............................ 310/52, 54, 58, 64, 71, 89
See application file for complete search history.

(56) References Cited

U.S. PATENT DOCUMENTS

| | | | | |
|---|---|---|---|---|
| 2007/0221446 A1* | 9/2007 | Laing | ........................ | G06F 1/26 184/1.5 |
| 2007/0223194 A1* | 9/2007 | Laing | ........................ | G06F 1/20 257/E23.098 |
| 2008/0289796 A1* | 11/2008 | Sasano | .................... | B60K 11/04 165/51 |
| 2010/0264762 A1* | 10/2010 | Dautel | ...................... | F01P 5/02 310/64 |
| 2011/0103011 A1* | 5/2011 | Koplow | .............. | H05K 7/20163 165/185 |
| 2014/0239755 A1* | 8/2014 | Nagao | .................... | H02K 5/203 310/68 D |
| 2014/0265743 A1 | 9/2014 | Chamberlin et al. | | |
| 2015/0028727 A1 | 1/2015 | Watanabe et al. | | |
| 2017/0033640 A1* | 2/2017 | Le Goff | .................... | H02K 9/00 |
| 2018/0255662 A1* | 9/2018 | Fan | ........................ | F04D 29/526 |
| 2019/0386537 A1* | 12/2019 | Dib | ........................ | H02K 7/083 |
| 2021/0104935 A1* | 4/2021 | Morrison | .................. | H02K 9/19 |
| 2022/0032767 A1* | 2/2022 | Lissner | .................... | F01P 11/10 |
| 2023/0093220 A1* | 3/2023 | Vanhee | .................... | H02K 9/19 310/54 |
| 2023/0118102 A1* | 4/2023 | Wallington | ............. | F02B 33/40 290/52 |
| 2023/0192289 A1* | 6/2023 | Fukuchi | ................ | B64C 39/024 244/4 R |

FOREIGN PATENT DOCUMENTS

| | | |
|---|---|---|
| FR | 2920491 A1 | 3/2009 |
| FR | 2921446 A1 | 3/2009 |
| FR | 2921447 A1 | 3/2009 |
| GB | 2518028 A | 3/2015 |
| JP | 2013220026 A | 10/2013 |

OTHER PUBLICATIONS

Written Opinion issued in corresponding PCT Application No. PCT/FR2019/051498, Dated Nov. 22, 2019 (5 Pages).
Office Action issued in counterpart Chinese Patent Application No. 201980048833.6 mailed Mar. 27, 2024 (15 pages).

* cited by examiner

Fig. 7

COOLING RADIATOR FOR MOTOR FAN UNIT

The field of the present invention is that of motorized fan units for motor vehicles. More particularly, the invention relates to a cooling radiator of a particular type, said cooling radiator being configured to be incorporated in an electric motor of a motorized fan unit. The invention also relates to a motorized fan unit comprising such a particular cooling radiator.

It is known in particular to associate a motorized fan unit with heat exchangers of motor vehicles, the motorized fan unit ensuring a flow rate of air through the associated heat exchanger(s) that is sufficient for the proper heat exchange operation, and for example the dissipation of heat energy generated by various peripheral components such as a combustion engine or an electrical circuit.

A known motorized fan unit comprises a fan and an electric motor for setting the fan in rotation. Currently, it is necessary to develop motorized fan units that are increasingly powerful, in order for it to be possible to ensure a sufficient flow rate of air through the heat exchangers. In this context, it is now common to use brushless electric motors. The higher energy efficiency thereof makes it possible to generate a greater flow rate of air while consuming the same amount of energy.

The use of a brushless electric motor in a motorized fan unit makes it necessary to use a control module configured to control the electric motor. Such a control module comprises electronic components that also need to be cooled in order to be able to function correctly. This is because ensuring that these components are cooled makes it possible to increase the lifetime thereof and therefore to improve the reliability of a motorized fan unit comprising such a brushless electric motor. It is known to dissipate the heat energy generated by the control module through cooling by an air flow generated for example by the fan of the motorized fan unit, the cooling radiator comprising fins extending through the flow of fresh air, thereby making it possible to maximize the area of contact between the cooling radiator and the air flow.

However, such a cooling means involving exchange between air and fins is not entirely satisfactory and has a number of drawbacks. The number and size of fins to be provided to effect the cooling involves a high cost for obtaining the parts of the cooling radiator and of the associated motorized fan unit. Furthermore, the increase in power required by contemporary motorized fan units requires an increasingly high power consumption, and therefore generates an increasingly large amount of heat energy to be dissipated, at the control module of the brushless electric motor of the motorized fan unit and air cooling is no longer sufficient to respond to the increasing heat dissipation demands in contemporary motorized fan units.

The aim of the present invention is to propose a novel particular cooling radiator that makes it possible to at least partially respond to the abovementioned drawbacks and also to bring about further advantages.

Another aim of the invention is to increase the reliability and also the lifetime of a motorized fan unit.

The invention achieves these aims, according to a first aspect, by virtue of a cooling radiator intended to be incorporated in a motorized fan unit of a motor vehicle, comprising a transverse wall extended perpendicularly at its perimeter by a peripheral wall so as to define an internal volume for receiving a control module intended to control an electric motor of the motorized fan unit, at least one wall of the cooling radiator forming a support for at least one portion of a cooling circuit in which a cooling fluid circulates.

The transverse wall of the cooling radiator extends perpendicularly to the air flow generated by the fan of the motorized fan unit. In other words, the transverse wall of the cooling radiator extends perpendicularly to the axis of rotation of the rotor of the electric motor.

This configuration according to the first aspect of the invention thus makes it possible to provide a cooling radiator comprising a heat dissipation capacity that is all the greater since it is now possible to combine cooling by the air skimming the outer surface of the cooling radiator and cooling by the cooling fluid circulating in the circuit portion in contact with one of the walls of the cooling radiator.

The cooling radiator according to the first aspect of the invention may comprise at least one of the following features, which can be considered individually or in combination and in which:

- the internal volume of the cooling radiator is intended to receive a control module of the electric motor; this configuration is notably effective in the context of the use of a brushless electric motor, the control module then serving to control the turning on and off and the speed of rotation of the brushless electric motor;
- the portion of the cooling circuit has a duct formed in the thickness of one wall of the cooling radiator; in other words, a duct, which forms part of the cooling circuit and in which the cooling fluid circulates, is formed in the material of which the cooling radiator is made; more particularly, the duct is formed in the transverse wall arranged through the air flow;
- the duct of the cooling circuit is arranged at an equal distance from an internal face or from an external face of the corresponding wall of the cooling radiator, the internal face of a wall being the face of said wall that is oriented toward the internal volume of the cooling radiator, and the external face of a wall being the face of said wall away from the internal face of this same wall; such an arrangement is advantageous in particular in terms of rigidity of the radiator thus formed;
- alternatively or in addition, the portion of the cooling circuit consists of a pipe separate from one or the other of the walls and attached in contact with at least one of the walls, on the outside of the latter on its internal face or its external face; it will be understood that if the space requirement is less optimized, such an arrangement makes it possible, with simplified implementation, to combine the heat exchange with a cooling fluid in contact with at least one wall of the cooling radiator and the heat exchange with the circulating air; in particular, when the cooling circuit is provided in contact with an external face of a wall of the cooling radiator, that is to say away from the control module housed in the internal volume defined by the walls of this cooling radiator, the cooling circuit is exposed to the air flow generated by the fan of the motorized fan unit, making it possible to promote the dissipation of the heat energy from the cooling radiator; when the cooling circuit is provided in contact with an internal face of the cooling radiator, the heat exchange between the control module and the cooling circuit is promoted;
- the cooling circuit has two tubes for the supply and outlet of a cooling fluid in fluidic communication with the duct, the tubes being disposed in a manner protruding from the peripheral wall in the transverse continuation of two ends of the duct; the tubes thus make it possible to connect the duct of the cooling circuit inside the cooling radiator and the loop forming the rest of the cooling circuit outside the cooling radiator; the supply tube allows the inlet of the cooling fluid into the cooling radiator and the outlet tube allows the discharge of the cooling fluid, loaded with heat energy, from the cooling radiator;

the mean section of a tube is larger than a mean section of the duct of the cooling circuit; the size of a section is measured in a direction perpendicular to the sense of flow of the cooling fluid in the tubes and the duct forming the cooling circuit; this configuration makes it possible to increase the speed of circulation of the cooling fluid in the duct of the cooling circuit, thereby promoting heat exchange at the cooling radiator;

the internal face of the transverse wall comprises at least one cavity for receiving an electronic component of the motorized fan unit, in particular a control unit of an electric motor, and/or a window for an air flow coming from the fan of the motorized fan unit to pass through, the cooling circuit being designed to pass as close as possible to said at least one cavity or window; more particularly, the cavity may not be a through-cavity when it is intended to receive an electronic component, and it is a through-cavity when it is intended to allow the passage of the air flow generated by the fan of the motorized fan unit, thereby making it possible to improve the dissipation of the heat energy at the cooling radiator; it will be understood that a cavity is a through-cavity when it extends from the internal face of the transverse wall to the external face of the transverse wall;

the transverse wall and/or the peripheral wall may have fins configured to promote heat dissipation at the cooling radiator, the fins making it possible to increase the area for heat exchange of the cooling radiator while having less of an impact on the spatial size of said cooling radiator; the presence of a cooling fluid circuit in contact with the cooling radiator may make it possible to reduce the size of the fins for equivalent heat exchange performance, and as a result to reduce in particular the size of the radiator and of the associated motorized fan unit; alternatively, when the cooling circuit allows sufficient cooling, the cooling radiator may have a smooth surface, that is to say one without fins;

the fins are formed on an external face of one of the walls, and they may be formed both on the external face of the transverse wall and on the external face of the peripheral wall;

the duct of the cooling circuit contains water, or an aqueous solution comprising ethylene glycol, forming the cooling fluid; the use of an aqueous solution comprising ethylene glycol allows the use of a cooling circuit comprising such a cooling fluid in a motor vehicle intended to be used or stored at negative atmospheric temperatures, the ethylene glycol making it possible to reduce the solidification temperature of the aqueous solution; alternatively, the cooling fluid may be a supercritical fluid; more particularly, the supercritical fluid is advantageously $CO_2$, also known as R744;

the cooling fluid comes from a main cooling circuit of the motor vehicle, or from a low temperature circuit, or from an independent cooling circuit; the main cooling circuit of the motor vehicle is the one that makes it possible to cool the combustion engine of the motor vehicle or, in the context of a vehicle that uses an electric motor to move around, to cool the batteries and/or said electric motor; the low temperature circuit may be, for example, an air-conditioning circuit of the motor vehicle; thus, the use of a main cooling circuit or of a low temperature circuit of the motor vehicle for causing the cooling fluid to circulate in the cooling circuit of the cooling radiator of the motorized fan unit makes it possible to limit the spatial size required for the cooling circuit of the motorized fan unit; alternatively, the use of an independent cooling circuit, specific to the motorized fan unit, allows said cooling circuit of the motorized fan unit to be independent of the operation and the state of the main cooling circuit, the cooling of the motorized fan unit then being ensured even when the cooling circuit is out of service, or when the main cooling circuit is saturated and incapable of dissipating the amount of heat energy it receives;

the cooling radiator is made of a material having a high heat dissipation capacity; in particular, the cooling radiator may be made of aluminum or copper.

According to a second aspect, the invention relates to an electric motor intended to be incorporated in a motorized fan unit of a motor vehicle, the electric motor comprising a cooling radiator according to the first aspect of the invention, the electric motor and the cooling radiator being arranged such that the internal volume of the cooling radiator faces away from the electric motor.

This configuration makes it possible to have an electric motor that has the advantages provided by the above-described cooling radiator.

The electric motor according to the second aspect of the invention advantageously comprises at least one of the following refinements, the technical features forming these refinements being able to be considered individually or in combination:

the motor has a rotor and a stator, and the rotor comprises a main wall perpendicular to the axis of rotation and a lateral wall extending perpendicularly around the perimeter of the main wall, the main wall and the lateral wall of the rotor defining an interior volume accommodating the stator, the stator being situated between the main wall of the rotor and the cooling radiator as mentioned above;

the external face of the transverse wall of the cooling radiator is oriented along the axis of rotation of the electric motor in the direction of the rotor and the stator;

the electric motor is of the brushless motor type; a brushless electric motor has higher energy efficiency than a brushed electric motor and this makes it possible, at equivalent power, to generate a greater amount of heat energy at the electric motor compared with a brushed electric motor; the stator has electrically powered coils and the rotor has permanent magnets, the configuration given to the magnetic field thus created allowing the rotation of the rotor, around or inside the stator;

the electric motor has a control module configured to control the rotation of the rotor and to send power supply instructions for the coils of the stator;

the rotor, the stator and the cooling radiator are parts exhibiting symmetry of revolution, or substantially exhibiting symmetry of revolution, that are arranged in a coaxial manner. Preferably, the rotor, the stator and the cooling radiator have a common axis, namely the axis of rotation of the electric motor.

According to a third aspect, the invention relates to a motorized fan unit comprising an electric motor according to the second aspect of the invention and a rotatable fan.

The motorized fan unit according to the third aspect of the invention advantageously comprises at least one of the following refinements, the technical features forming these refinements being able to be considered individually or in combination:
- the fan is set in rotation by the electric motor; in other words, the rotor, the stator and the fan are coaxial;
- the fan of the motorized fan unit comprises a plurality of vanes for generating an air flow when the fan is set in rotation; more particularly, the air flow is generated in a direction parallel to the axis of rotation of the fan;
- the external face of the transverse wall of the cooling radiator is oriented along the axis of rotation toward the fan; in other words, the external face of the transverse wall is exposed to the air flow that is generated by the fan and passes through the rotor/stator assembly of the electric motor; this configuration thus makes it possible to promote the dissipation of the heat energy from the cooling radiator.

Figure 1:
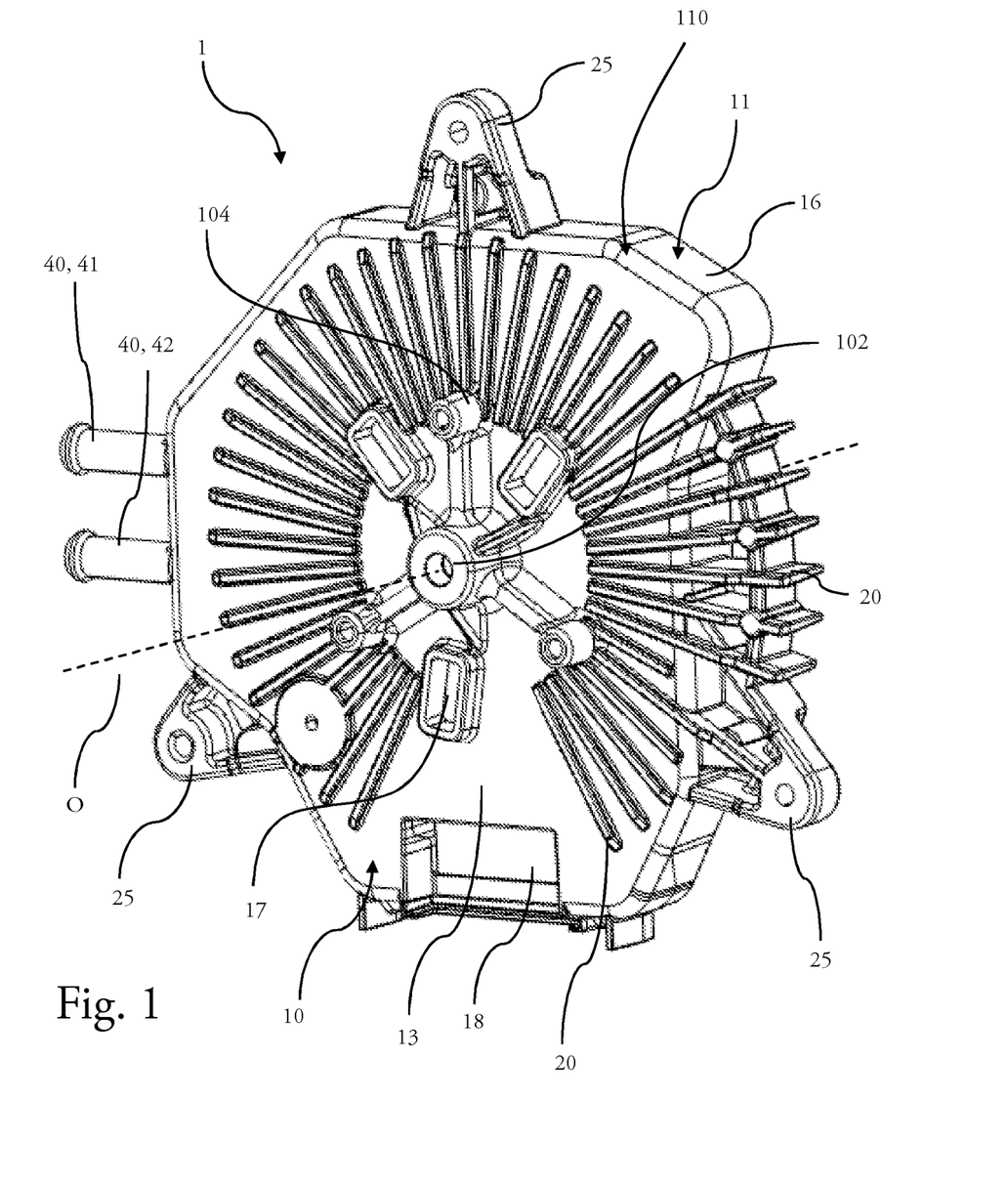
FIG. 1 is a perspective view of a cooling radiator according to the first aspect of the invention, revealing in particular the outside, that is to say the external faces, of this radiator.

Further features, details and advantages of the invention will become more clearly apparent from reading the following description, and also from a number of exemplary embodiments given by way of nonlimiting indication, with reference to the appended schematic drawings, in which:

FIG. 1 illustrates a perspective view of an exemplary embodiment of a cooling radiator 1 according to the first aspect of the invention.

The cooling radiator 1 comprises a transverse wall 10 and a peripheral wall 11 perpendicularly extending the transverse wall 10, the peripheral wall 11 being situated at the perimeter of this transverse wall 10. The transverse wall 10 and the peripheral wall 11 define an internal volume 14, which can be seen in FIG. 2. The transverse volume 10 extends perpendicularly to an axis O, the axis O being the axis of rotation of an electric motor of a motorized fan unit in which the cooling radiator 1 is intended to be incorporated.

Figure 2:
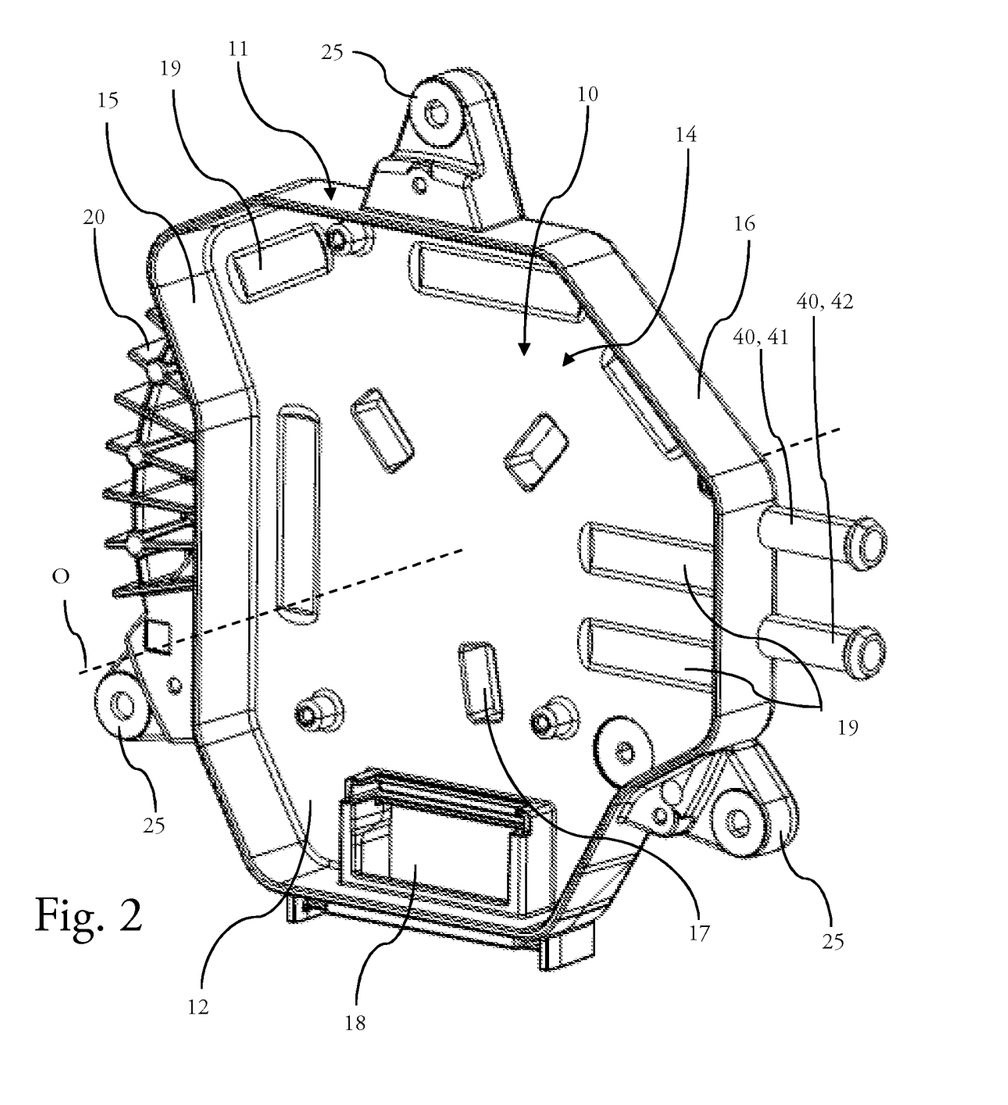
FIG. 2 is a view of the cooling radiator illustrated in FIG. 1 at a different perspective angle, revealing the inside, that is to say the internal faces, of this radiator.

The transverse wall 10 comprises an internal face 12 oriented toward the internal volume and an external face 13 situated on the opposite side of the transverse wall 10 with respect to the internal face 12. In a similar manner, the peripheral wall 11 comprises an inner face 15, not visible in FIG. 1, that is oriented toward the internal volume 14, and an outer face 16 situated on the opposite side of the peripheral wall 11 with respect to the inner face 15. The internal volume 14 is configured in terms of shapes and dimensions to house a control module, which can be seen in FIG. 6.

The cooling radiator 1 comprises a plurality of fins 20 arranged in a manner protruding from the external face 13 of the transverse wall 10, the fins 20 extending radially with respect to the axis of rotation O. The fins 20 thus formed make it possible to increase the area of the external face 13 of the transverse wall 10 of the cooling radiator 1, thereby making it possible to improve the heat dissipation capacity of the cooling radiator 1.

The cooling radiator 1 comprises three fastening members 25 extending radially outward from the outer face 16 of the peripheral wall 11. The fastening members 25 are configured to allow the cooling radiator 1 to be fastened to a support.

The cooling radiator 1 is specific according to the invention in that it has a portion 40 of a cooling circuit. More particularly, the portion 40 of the cooling circuit comprises a duct, which is not visible here since it is housed in the thickness of a wall of the radiator and inside which a cooling fluid circulates, and a first tube 41 and a second tube 42 in fluidic communication with the duct.

The two tubes 41, 42 are disposed in a manner protruding from a wall 10, 11 of the cooling radiator, in this case the peripheral wall 11, extending in a direction away from the internal volume 14. The first tube consists of a tube for the supply of the cooling fluid and the second tube consists of a tube for the outlet of the cooling fluid, these two tubes being arranged in the transverse continuation of two ends of the duct 43.

More particularly, the tubes extend in this case side by side from one and the same portion of the peripheral wall 11, namely a proximal portion 110 forming a junction with the transverse wall 10.

The cooling radiator comprises, in a transverse wall 10 thereof, a central barrel 102 disposed substantially at the center of the transverse wall 10, and three positioning barrels 104 arranged concentrically around the central barrel. The central barrel 102 forms a housing for receiving a driveshaft of the motor and the positioning barrels 104 are configured to receive positioning pins of the stator of the stator/rotor assembly of the electric motor associated with the cooling radiator.

The cooling radiator 1 comprises through-windows 17, of which there are three in this case. The windows 17 are disposed, in the example illustrated, around the central barrel 102, alternating with the positioning barrels 104. Each window 17 forms a passage from the internal face 12 to the external face 13 of the transverse wall 10. The windows 17 make it possible to expose the internal volume 14 of the cooling radiator 1 to an air flow generated by a fan of the motorized fan unit, thereby promoting the heat dissipation of the heat energy at the cooling radiator 1.

The cooling radiator 1 also comprises an opening 18 provided peripherally at the junction of the transverse wall 10 and the peripheral wall 11. The opening 18 allows the passage of electrical connection elements between a control module, visible in FIG. 5, that is housed in the internal volume 14 of the cooling radiator 1, and the stator/rotor assembly of the electric motor that the control module is involved in controlling.

FIG. 2 shows a perspective view of the cooling radiator 1 illustrated in FIG. 1, revealing the internal face 12 of the transverse wall 10 of the cooling radiator 1.

A plurality of cavities 19 are provided in the internal face 12 of the transverse wall 10. More particularly, the cavities 19 are formed by a discrete deformation extending from the internal face 12 toward the inside of the transverse wall 10. The depth of these cavities, in the direction of the axis of rotation O, is less than the thickness in the same direction of the transverse wall 10.

Figure 3:
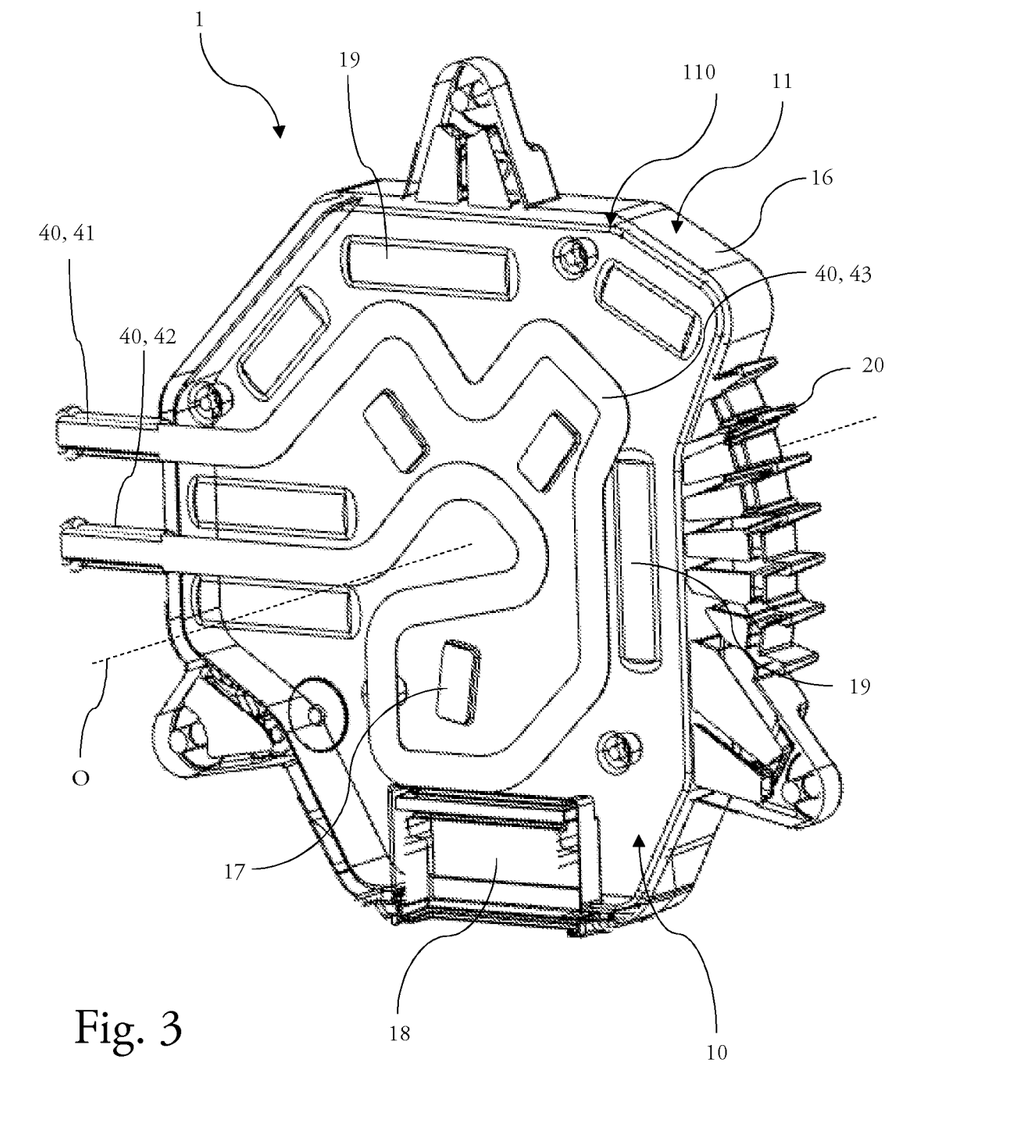
FIG. 3 is a view of the cooling radiator at a perspective angle similar to the one in FIG. 1, in which the transverse wall is shown in cross section in order to reveal a cooling circuit duct formed in the thickness of this transverse wall.

These cavities 19 form, in the thickness of the transverse wall, impressions that can be seen in FIG. 3. This figure is a view in cross section taken between the internal face 12 and the external face 13 of the transverse wall 10 of the cooling radiator 1, in order in particular to reveal the duct 43 of the portion 40 of the cooling circuit. More particularly, the duct 43 is provided in the body of the transverse wall 10, between the internal face 12 and the external face 13. The duct 43 is recessed into the material forming the transverse wall 10, and it will be understood that this duct 43 is made using an insert disposed in the injection mold of the cooling radiator.

The duct 43 fluidically connects the first tube 41 and the second tube 42, thereby allowing the circulation of a cooling fluid between the first tube 41 and the second tube 42. The duct 43 is arranged so as to pass close to the cavities 19, the windows 17 and the opening 18, thereby making it possible to maximize the effectiveness of the cooling of the cooling radiator 1.

Figure 4:
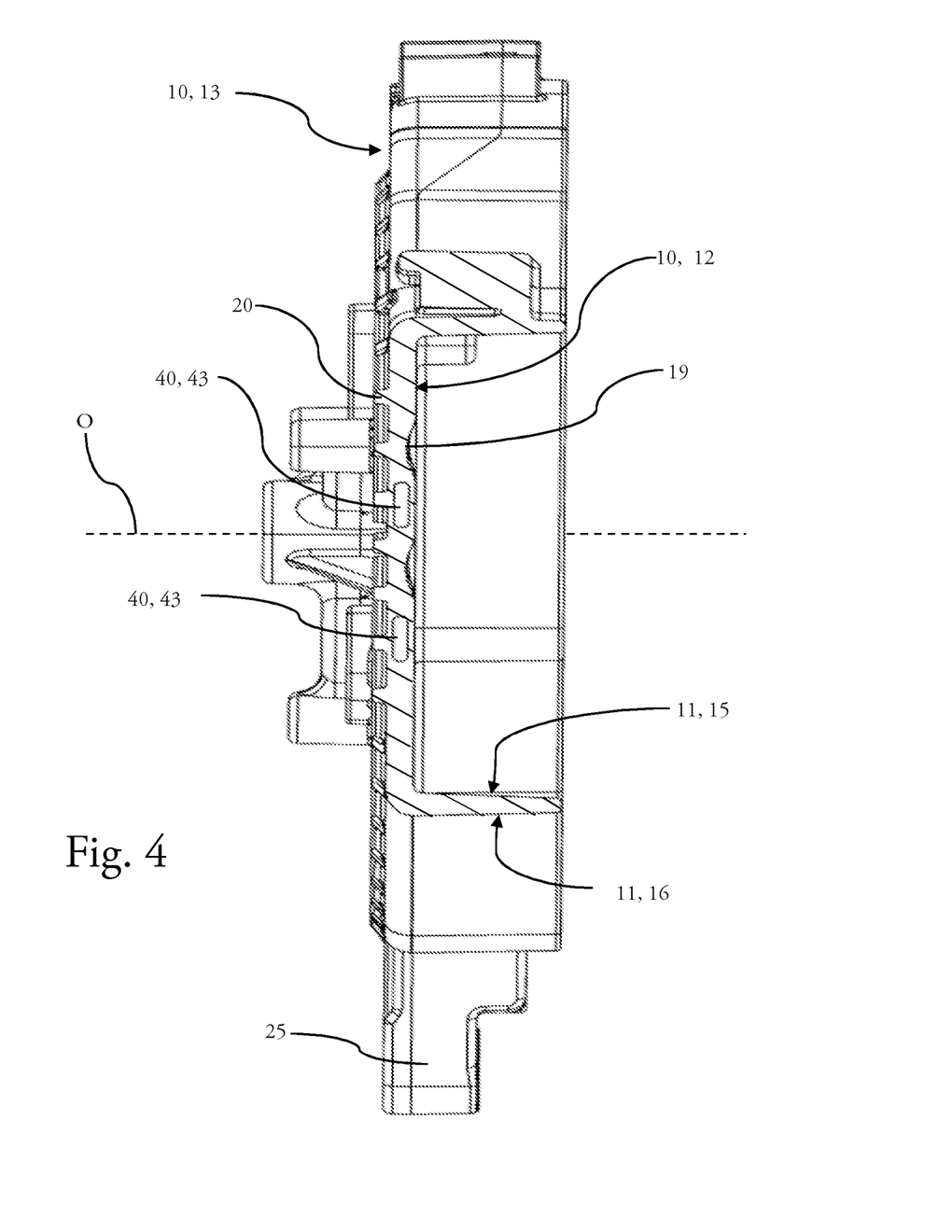
FIG. 4 illustrates an axial section, in face-on view, of the cooling radiator illustrated in FIGS. 1, 2 and 3.

In FIG. 4, it may be noted that the duct 43 of the portion 40 of the cooling circuit has a rectangular flow cross section. The duct 43 is provided in the material of the transverse wall 10, between the internal face 12 and the internal face 13. More particularly, the duct 43 is provided substantially at an equal distance from the internal face 12 of the transverse wall 10 and from the external face 13 of the transverse wall 10. This configuration in which the duct 43 is provided in the transverse wall 10, between the internal face 12 and the external face 13, makes it possible to promote the dissipation of the heat energy from the cooling radiator, the internal face 12 of the transverse wall 10 being in contact with a control module, generating heat energy, and the external face 13 of the transverse wall 10 being exposed to the air flow generated by a fan of the motorized fan unit in which the cooling radiator 1 is incorporated.

FIG. 4 makes it possible to see that the duct 43 of the portion 40 of the cooling circuit passes close to the cavities 19, thereby promoting the dissipation of the heat energy generated by the components of the control module 50 that are housed in the cavities 19 of the cooling radiator 1, as will be described below.

Figure 5:
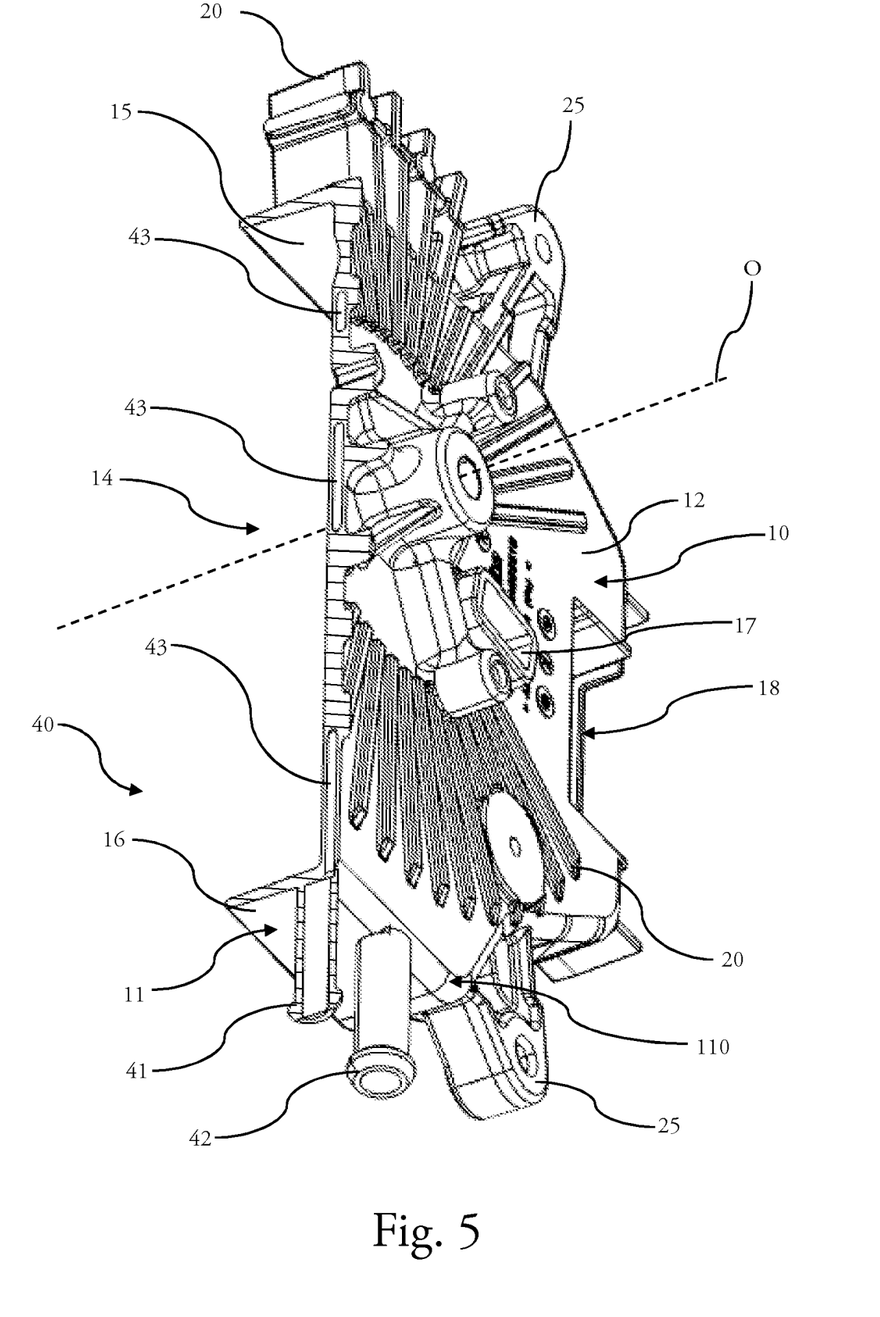
FIG. 5 illustrates the axial section in FIG. 4 in a perspective view.

FIG. 5 reveals the fact that the flow cross section of the duct 43 provided in the transverse wall 10 is narrower than the flow cross section of the tubes, in this case the first tube 41, of the portion 40 of the cooling circuit. The flow cross section of the duct 43 and the flow cross section of the first tube 41, or of the second tube 42, is measured in a plane perpendicular to the transverse wall in which the duct 43 is inscribed. This configuration in which the flow cross section of the duct 43 is smaller than the flow cross section of the cooling circuit at the first tube 41 and the second tube 42 makes it possible to increase the speed of circulation of the cooling fluid in the duct 43, at the cooling radiator 1, thereby promoting the heat exchange between the cooling fluid and the cooling radiator 1.

Figure 6:
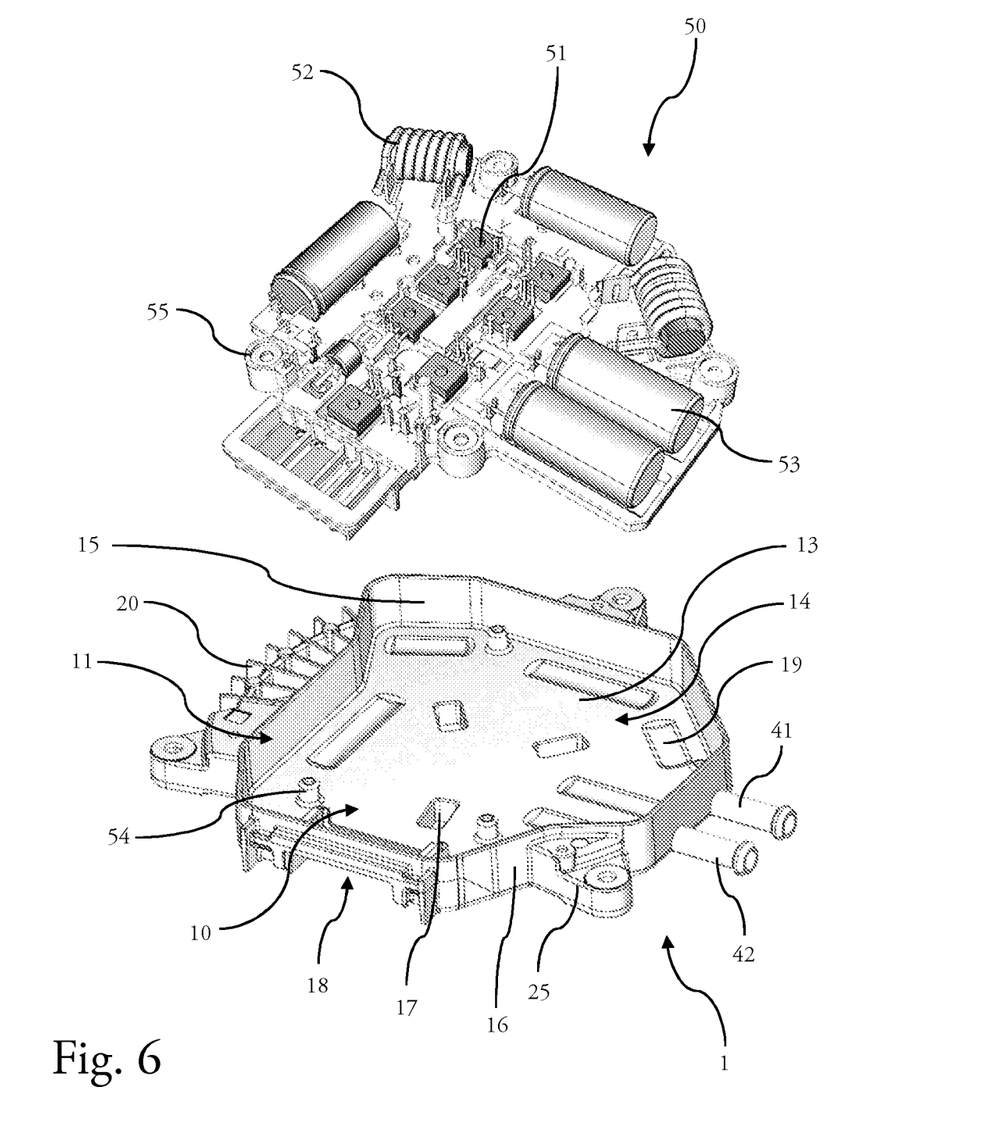
FIG. 6 is a perspective exploded view of the inside of the cooling radiator illustrated in FIGS. 1 to 5 and of a control module intended to control an electric motor.

In FIG. 6, the above-described cooling radiator 1 according to the first aspect of the invention is associated with a control module 50 intended to control an electric motor of a motorized fan unit in which this cooling radiator 1 and this control module 50 are incorporated.

The control module 50 is intended to be housed in the internal volume 14 of the cooling radiator 1. More particularly, the control module 50 comes to bear against the internal face 12 of the transverse wall 10 of the cooling radiator 1. Thus, the control module 50 comprises a plurality of blocks 55 that are respectively intended to cooperate with a protrusion 54 situated on the internal face 12 of the transverse wall 10 of the cooling radiator 1, each protrusion 54 being inserted into a block 55 so as to maintain the position of the control module 50 with respect to the cooling radiator 1.

The control module 50 makes it possible to control the electric motor in which it is incorporated. More particularly, the control module 50 makes it possible in particular to control the power supply of a winding formed on the stator in order to control the magnetic field generated between the rotor and the stator of the brushless electric motor according to one aspect of the invention.

The control module comprises in particular a plurality of transistors 51. The transistors 51 are in this case disposed in a central part of the control module 50. Thus, at least some of the transistors 51 are situated in the axial continuation, with respect to the axis of rotation O, of the windows 17 in the cooling radiator 1 when the control module 50 is housed in the internal volume 14 of the cooling radiator 1, thereby promoting the cooling of the transistors 51.

In the example illustrated, the control module also comprises two coils 52 and four capacitors 53. The coils 52 and the capacitors 53 are situated at the periphery of the control module 50, around the transistors 51. Each coil 52 and each capacitor 53 is intended to be housed at least partially in a cavity 19 of the cooling radiator when the control module is housed in the internal volume 14 of the cooling radiator. Thus, the coils 52 and the capacitors 53 are at a smaller distance from the external face 13 of the transverse wall 10 of the cooling radiator 1, thereby allowing more effective cooling of the coils 52 and the capacitors 53, the external face 13 being intended to be exposed to an air flow generated by a fan of the motorized fan unit.

Figure 7:
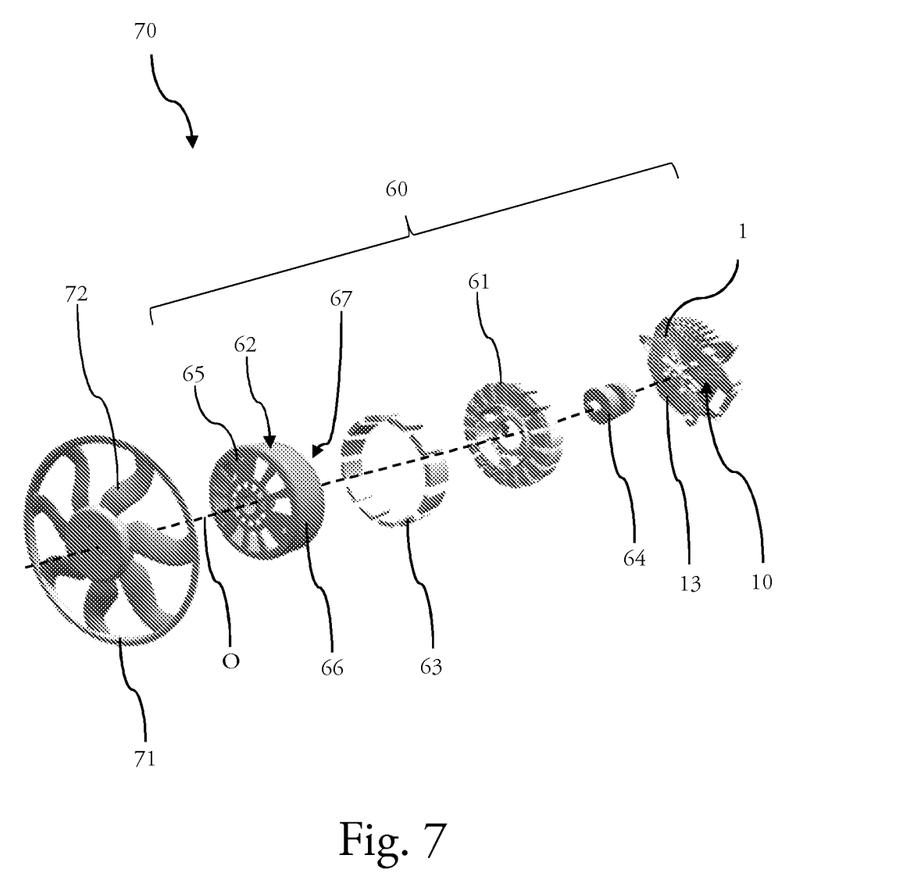
FIG. 7 is an exploded perspective view illustrating an exemplary embodiment of an electric motor according to the second aspect of the invention and an exemplary embodiment of a motorized fan unit according to the third aspect of the invention and having the electric motor.

FIG. 7 illustrates, in more detail, the electric motor 60 and the associated motorized fan unit that has the cooling radiator according to the first aspect of the invention.

The electric motor 60 comprises a cooling radiator 1, a stator 61 and a rotor 62 that is rotatable about the axis of rotation O, the rotor in this case being external, that is to say arranged around the stator 61. The rotor 62 is in this case bell-shaped, with a main wall 65 extending across the axis of rotation O and a lateral wall 66 extending the perimeter of the main wall 65 substantially perpendicularly.

A plurality of magnets 63 are disposed circumferentially on the internal radial face of the lateral wall 66 of the rotor 62, and an electrical winding is wound around teeth formed in the body of the stator. The winding is electrically connected to the control module via electrical connection elements made to pass through the opening 18 as described above, the power supply of the winding thus making it possible to generate a magnetic field in which the permanent magnets move and generate the rotation of the rotor 62.

The exploded view in FIG. 7 also shows that the electric motor 60 comprises a driveshaft and rolling bearings 64, the driveshaft and a rolling bearing being fitted into the central barrel provided in the external face of the cooling radiator.

The motorized fan unit 70 comprises the electric motor 60 as has just been described and also a fan 71 that is able to be set in rotation about the axis of rotation O by the electric motor 60 and the associated driveshaft. The stator/rotor assembly 61, 62 is situated between the cooling radiator 1 and the fan 71 along the axis of rotation O. In other words, the fan 71 is situated on the other side of the motorized fan unit 70 with respect to the cooling radiator 1. The fan 71 of the motorized fan unit 70 comprises a plurality of vanes 72 for generating an air flow when the fan is set in rotation by the electric motor 60 of the motorized fan unit 70. It can be seen that the cooling radiator is arranged in this motorized fan unit such that the external face 13 of the transverse wall 10 faces the electric motor 60 and the fan and that this external face 13 receives the air flow coming from the fan.

The above description sets out clearly how the invention achieves the aims set therefor, namely optimal cooling of the motorized fan unit and in particular of the control module of the electric motor that this motorized fan unit has. This optimal cooling is obtained by the combination of the cooling by the air circulating through the motorized fan unit following the actuation of the fan and of the cooling by a coolant circulating in a cooling circuit, a portion of which is in contact with the cooling radiator in order to facilitate the discharge of heat energy. In this context, it is advantageous that the portion in contact with the radiator is housed in the thickness of the latter in order to limit the overall size of the radiator. Of course, an embodiment with a cooling circuit produced independently of the radiator and then attached to one of the walls of this radiator would have equivalent advantages in terms of combined cooling by air and by coolant.

Of course, the invention is not limited to the examples that have just been described, and numerous modifications may be made to these examples without departing from the scope of the invention. In particular, the various features, forms, variants and embodiments of the invention may be combined with one another, in various combinations, as long as they are not mutually incompatible or mutually exclusive. In particular, all of the variants and embodiments described above are able to be combined with one another.

The invention claimed is:

1. A cooling radiator for a motorized fan unit of a motor vehicle, comprising:
   a transverse wall extended perpendicularly at its perimeter by a peripheral wall so as to define an internal volume,
   wherein at least one wall of the cooling radiator forms a support for at least one portion of a cooling circuit in which a cooling fluid circulates,
   wherein the portion of the cooling circuit includes a duct formed in a thickness of one wall of the cooling radiator, and
   wherein the duct of the cooling circuit is arranged at an equal distance from an internal face and from an external face of the one wall of the cooling radiator.

2. The cooling radiator as claimed in claim 1, wherein the cooling circuit has two tubes for a supply and an outlet of a cooling fluid in fluidic communication with the duct, the tubes being disposed in a manner protruding from one wall of the cooling radiator in a transverse continuation of two ends of the duct.

3. The cooling radiator as claimed in claim 2, wherein a mean section of a tube is larger than a mean section of the duct of the cooling circuit.

4. The cooling radiator as claimed in claim 1, wherein an internal face of the transverse wall comprises at least one cavity for receiving an electronic component of the motorized fan unit consisting of a control unit of an electric motor, and for a window for an air flow coming from the fan of the motorized fan unit to pass through, the cooling circuit being configured to pass as close as possible to said at least one cavity or window.

5. The cooling radiator as claimed in claim 1, wherein the duct of the cooling circuit contains water, or an aqueous solution containing ethylene glycol, forming the cooling fluid.

6. The cooling radiator as claimed in claim 1, wherein the transverse wall and the peripheral wall has fins configured to promote heat dissipation at said cooling radiator.

7. An electric motor configured to be incorporated in a motorized fan unit of a motor vehicle, the electric motor comprising:
   a cooling radiator comprising:
      a transverse wall extended perpendicularly at its perimeter by a peripheral wall so as to define an internal volume,
   wherein at least one wall of the cooling radiator forms a support for at least one portion of a cooling circuit in which a cooling fluid circulates,
   wherein the portion of the cooling circuit includes a duct formed in a thickness of one wall of the cooling radiator,
   wherein the duct of the cooling circuit is arranged at an equal distance from an internal face and from an external face of the one wall of the cooling radiator, and
   wherein the electric motor and the cooling radiator are arranged such that the internal volume of the cooling radiator faces away from the electric motor.

8. A motorized fan unit of a motor vehicle comprising:
   an electric motor comprising:
      a cooling radiator having a transverse wall extended perpendicularly at its perimeter by a peripheral wall so as to define an internal volume,
   wherein at least one wall of the cooling radiator forms a support for at least one portion of a cooling circuit in which a cooling fluid circulates,
   wherein the portion of the cooling circuit includes a duct formed in a thickness of one wall of the cooling radiator;
   wherein the duct of the cooling circuit is arranged at an equal distance from an internal face and from an external face of the one wall of the cooling radiator, and
   wherein the electric motor and the cooling radiator are arranged such that the internal volume of the cooling radiator faces away from the electric motor; and
   a fan that is set in rotation by the electric motor.

\* \* \* \* \*